May 29, 1956 R. J. SLUTZ 2,748,269
REGENERATIVE SHAPING OF ELECTRIC PULSES
Filed Nov. 2, 1950
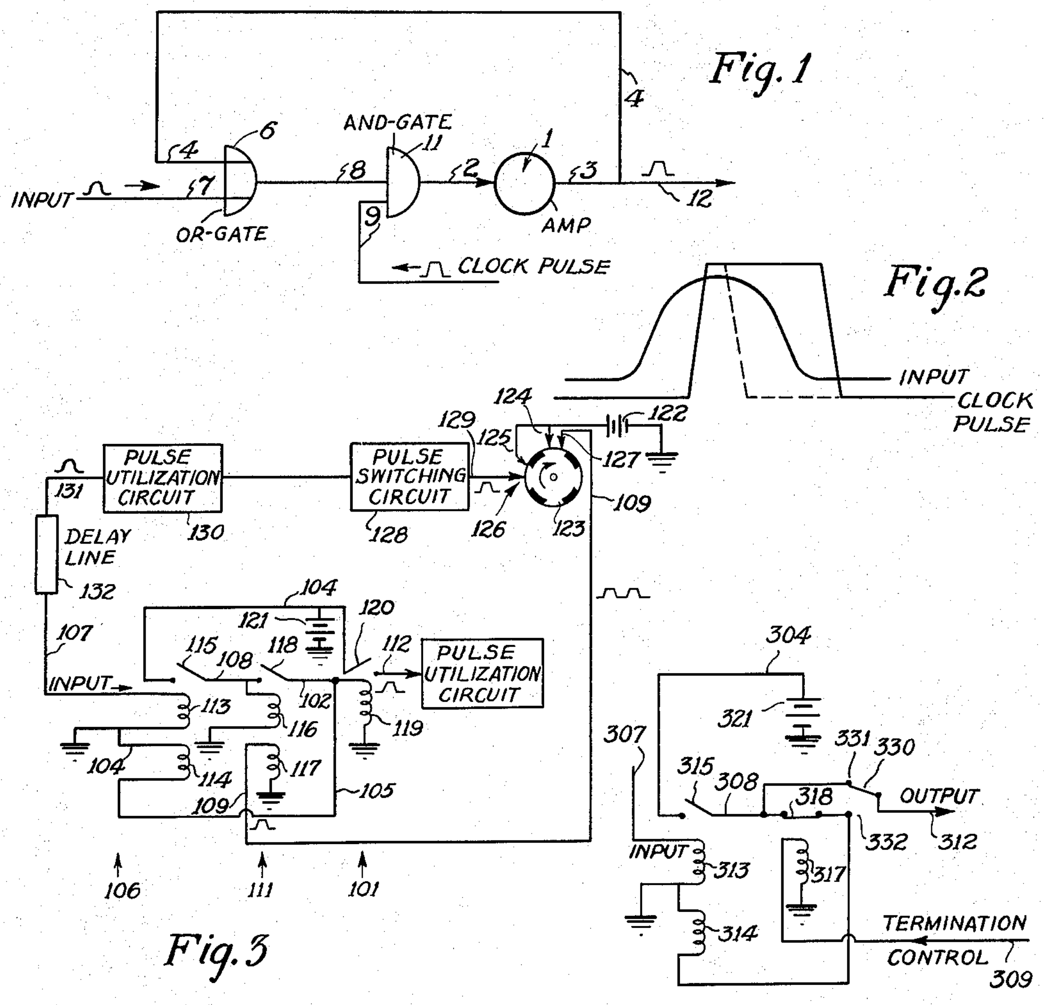
Fig. 1, Fig. 2, Fig. 3
Fig. 4
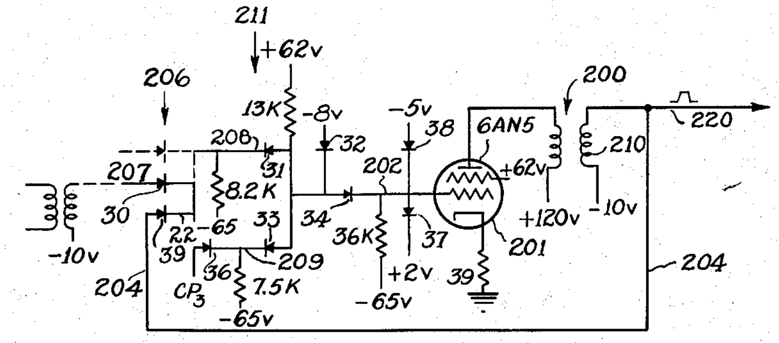
Fig. 5
INVENTOR.
Ralph J. Slutz
BY Max L. Libman
ATTORNEY United States Patent Office 2,748,269

Patented May 29, 1956

2,748,269

REGENERATIVE SHAPING OF ELECTRIC PULSES

Ralph J. Slutz, Kensington, Md., assignor to the United States of America as represented by the Secretary of Commerce Application November 2, 1950, Serial No. 193,696

4 Claims. (Cl. 250—27)

(Granted under Title 35, U. S. Code (1952), sec. 266)

The invention herein described may be made and used by or for the Government of the United States without payment to me of any royalty therefor in accordance with the provisions of the Act of April 30, 1928 (Ch. 460, 45 Stat. L. 467).

This invention relates to the art of electric pulse circuitry wherein electric pulses of very short duration are utilized to control, actuate, and energize electric circuit operations; and the invention relates more particularly to an arrangement for reshaping pulses which have deteriorated in duration, amplitude, or phase so that they may be effective for further circuit utilization, or alternatively, for changing the shape of a pulse in one circuit to a shape more desirable for use in another circuit.

Electric pulses are used in many fields, such as communications (coded pulse telephony, for example), radar, electronic counters, and particularly in electronic digital computers In all of these applications pulses of very short duration and high repetition rate, ranging from kilocycle rates to multi-megacycle rates, are employed. These pulses, for obvious reasons, must be maintained at a definite amplitude, duration, and phase, within as close limits as practicable; however, as they travel in their utilization circuits, the effect of circuit impedance and of translating elements, such as vacuum tubes and other nonlinear elements tends to alter the shape and phase of the pulses. It is therefore necessary to introduce at various points in the use circuits, means for reshaping and rephasing the deteriorated pulses. A common expedient for this purpose is the substitution of a fresh undeteriorated pulse from a pulse source, the deteriorated pulse being used to trigger the fresh pulse into the utilization circuit. One way in which this can be done is to supply both of these pulses to two grids of a vacuum tube so biased that the tube conducts (or vice versa) only when both voltage pulses are effective on the respective grids. To be effective, this expedient requires the deteriorated pulse to be broader than and to overlap the fresh pulse. It is an object of my invention to eliminate this limitation and require only that the deteriorated pulse be present and above a minimum amplitude at the beginning of the introduction of the fresh pulse. It is a further object of my invention to provide means whereby a signal pulse which may or may not be badly deteriorated can be used to initiate the introduction into a utilization circuit of a fresh pulse of any desired amplitude, duration, and phase, within wide limits.

My invention also comprehends initiation or "triggering" of a fresh output pulse by an input pulse arriving at a self-holding or regenerative circuit, the output pulse termination being determined by a control pulse from a control circuit; this control circuit may be a clock pulse source or may be an entirely different circuit whose output is utilized to determine the time of termination of the output pulse. In this case, the duration of the pulse may be controlled according to any desired or predetermined criterion, its initiation being determined by the input pulse which may be a deteriorated pulse or may be an undeteriorated pulse used merely to initiate an output pulse of different duration.

My invention is of particular advantage in those cases were the deteriorated pulse has become narrower than its original configuration and therefore is of less duration than the clock pulse. This means that it must be broadened to the width of the clock pulse. One known method for doing this is by the use of a delay line so arranged that the narrowed pulse is tapped off at various points on the delay line as it travels therealong, so that two or three delayed pulses are fed into the same gate in known fashion to produce the broader pulse. The disadvantage of this is that the same gate is driven two or three times by the same pulse, and this involves a loss of power, since the energy of the driving pulse must be thus spread out over a longer time. My invention obviates this disadvantage as will be shown below, and thus provides increased power over what is possible with delay-line broadening. It also permits a broader pulse than is practical with a delay line since attenuation in the delay line limits the amount of broadening possible.

Another advantage of my improved pulse-broadening system is that the timing tolerance is improved because of operating with the coincidence of a narrow and a broad pulse, since if a narrow pulse is timed to occur in the center of the broad pulse, a relative phase shift in either direction can be tolerated of practically one-half the width of the broad pulse.

It is a particular object of my invention to initate a regenerative voltage pulse of relatively great inherent width or duration by the combined presence of the deteriorated pulse and the fresh pulse and to terminate this regenerated pulse prior to its natural duration upon termination of the fresh pulse alone.

It is a further object of my invention to provide means for utilizing an introduced fresh pulse to energize a subsequent utilization stage to that where it is introduced and at the same time to deenergize the stage at which the original fresh pulse was introduced, thus providing energization of successive stages in successive units of time.

Further objectives and advantages of my invention will become apparent from the more detailed description of a particular embodiment of my invention which is given below, and from the accompanying drawings, in which:

Figure 1 is a schematic logical drawing indicating the manner in which a pulse may be reshaped according to this invention.

Figure 2 is a pulse-timing diagram showing the relation between the deteriorated pulse and the reshaped pulse.

Figure 3 is a circuit diagram of a particular circuit arrangement for carrying out the logical operation depicted in Figure 1.

Figure 4 shows an arrangement for utilizing an input pulse to initiate an output pulse of desired duration.

Figure 5 shows a circuit arrangement for practicing the invention with high-frequency pulse repetition rates, i. e., at electronic speeds.

Referring to Figure 1, the numeral 1 represents logically the concept of a vacuum tube having an input 2 and an output 3. Lead 4 from the output may be fed back into input 2 in known fashion if the tube is automatically regenerated; that is, once started to operate in this condition it will continue. This could be, for example, any known type of oscillator circuit, although in practice I do not use such an arrangement. The symbol 6 represents an element having input leads 4 and 7 and an output lead 8, with the characteristic that it will transmit an output at 8 on receiving an input from either 4 or 7. This could, of course, be represented merely as a junction point, but in practice a more sophisticated arrangement is required in order to prevent interference of currents between circuits 4 and 7. Any element having the functions of element 6 will be termed an or-gate because it performs the function of logical "or" in passing a signal from any of its inputs.

Numeral 11 represents another element whose input leads are shown at 8 and 9, and whose output lead 2 is the input to the vacuum tube 1. Element 11 has the characteristic of passing a signal on 2 only if it simultaneously receives signals on leads 8 and 9. In other words, element 11 is a coincidence gate and requires the coincidence of signals on 8 and 9 in order to transmit on 2 a signal which will be transmitted only during the period of such coincidence. Any element having the characteristics of coincidence gate 11 will be termed an and-gate. Such a gate has the function of logical "and" in that the occurrence of signals on all inputs is required to produce an output. The input which is fed in on lead 7 is the deteriorated pulse which is to be reshaped. The input which is fed in on lead 9 is a regular clock pulse (so-called), that is, a pulse having the desired shape and phase. This clock pulse in practice may be obtained from a suitable circuit. Therefore these pulses occur at a particular frequency for a particular circuit.

In practice, in one circuit in which this element is used a megacycle clock pulse rate is employed; that is, the clock pulses occur at a repetition rate of one megacycle, and each pulse is approximately one-half microsecond in duration with another one-half microsecond between adjacent pulses. With this arrangement, if there is an input to the tube at any time during a clock pulse, the tube will come on at that time. The regenerative path will then hold it until the end of the clock pulse when it will stop regardless of what the input is doing, since coincidence is required at element 11. In practical application then, it is desirable to have the input overlap the first portion of the clock pulse as shown in Figure 2. Then, if there is an input, the tube will be turned on as soon as the clock pulse starts and will remain on for one full clock pulse duration regardless of what the input does thereafter. Thus it acts as a pulse reshaper which may either broaden or narrow a pulse in order to bring it to the standard duration. If the input stops before the clock pulse does, the device will broaden the output up to a regular clock pulse. If the input lasts longer than the clock pulse, the device will cut it off at the end of the clock pulse. Of course, there will be some finite time for the transmission of signals around the regenerative loop, and for proper operation of this circuit the input must be maintained long enough for this loop to close. In the actual circuits with which we have been working, this time is of the order of magnitude of one-half to one-tenth of a microsecond, so for clean operation in the manner described above, the input should not only overlap the front edge of the clock pulse but should extend into the clock pulse for at least this additional time. In this sense the circuit behaves very much like a very narrow clock pulse (as indicated by the dotted line in Figure 2) which samples the input signal and then, if something is received, broadens it up to the full clock-pulse width. On the other hand, if the input were delayed so that it started after the leading edge of the clock pulse, the output would start when the input did and continue to the end of the clock pulse. It is therefore usually desirable for the input pulse to be so timed that it arrives first.

Figure 3 is a schematic circuit diagram which shows one way in which the functions described logically in Figure 1 may be obtained. Or-gate 6 of Figure 1 is embodied in a corresponding gate represented by the element directly above reference numeral 106, and-gate 11 is represented by the element directly above reference character 111, and the tube 1 is represented by the relay and battery directly above reference character 101. An input coming in on line 107 which corresponds to line 7 of Figure 1 will energize the input relay winding 113, which is capable by itself of closing switch 115, thus establishing a circuit through battery 121 through switch 115 along line 108 through coincidence relay winding 116 to ground. This winding itself is not sufficiently powerful to close switch 118. If, however, the second winding 117 of and-gate 111 is simultaneously energized by a clock pulse on line 109, as will be later described, the combined effects of both of these windings is sufficient to close switch 118 although both windings must remain energized to keep this switch closed. With switch 118 closed, output source control winding 119 is now energized from the same battery 121 to close switch 120 through the pulse utilization circuit. At the same time closing of switch 118 (switch 115 being previously closed) provides a circuit from battery 121 through switches 115 and 118 through leads 102 and 105 to holding coil 114, which is sufficiently powerful to hold switch 115 closed although not necessarily sufficiently powerful to close it initially. The arrangement thus described will perform the functions required and described in Figure 1. The input pulse will close switch 115 and energize winding 116. If a clock pulse occurs at any time during the input pulse, switch 118 will be closed, which will in turn close switch 120 to initiate a pulse in the utilization circuit. Upon cessation of the clock pulse, winding 117 becomes deenergized and at that instant switch 118 opens, which results in switch 120 being opened and the output pulse being terminated. If the input pulse on line 107 has terminated before the ending of the clock pulse, switch 115 will nevertheless remain closed because of the action of holding coil 114. Thus all the requirements are met by this circuit which will put out on line 112 a pulse which is of the exact shape and duration of the clock pulse, it being assumed, of course, that the action of all of these elements is instantaneous. To complete the circuit additional elements are shown for providing a clock pulse and a utilization pulse and to indicate the nature of the timing means which insures that the input pulse arrives in advance of a clock pulse, as required. Battery 122 is provided with two brushes, 124 and 125, which rest on adjacent insulating segments of commutator 123. Adjacent to brush 124 is another brush 127 connected to line 109, which is the clock pulse input line, in such fashion that as the commutator 123 rotates, brushes 124 and 127 are successively switched in and out to provide square pulses on line 109 at a rate depending upon the rotation rate of the commutator disk 123. Brushes 125 and 126 similarly bear on an adjacent segment of the commutator disk so that at the same time a pulse is emitted on line 109 a pulse is also emitted on line 129. The pulse on line 129 may be switched by any form of circuit-switching arrangement (not shown) into a suitable circuit for utilization, represented generally at 130. The nature of this utilization circuit is of no interest for the present purpose except that in any such circuit the pulse shape will tend to become deteriorated. The deteriorated pulse is emitted on line 131 and passed through delay line 132, whereby it is sufficiently delayed so that it will now arrive slightly before the following pulse emitted on line 109 rather than in coincidence with the pulse which was emitted at the same time as the pulse under consideration. This shows schematically the general manner in which the timing pulses would be arranged in a practical utilization circuit.

Figure 4 shows schematically a more generalized representation of the concept of my invention. The input on line 307 actuates coil 313 just as the input on line 107 of Figure 3 actuated coil 113; closing of switch 315 in this modification directly initiates an output pulse on line 312, from battery 321 through line 308, contact 331, and manually-operated switch 330 (which could, of course, be remotely controlled). Closing switch 315 also establishes a holding current in coil 314 through normally-closed switch 318. It now requires a signal on termination control line 309 to release the holding coil to permit switch 315 to open (the input signal being of sufficiently short duration so that it is now terminated) to terminate the output signal. If the input signal is not now terminated, the output signal will continue regardless of any attempted action by the termination control signal on line 309. Thus the input signal determines the initiation of the output signal, which output signal then continues until such time as a termination control signal is received on line 309 at a time which is subsequent to the termination of the input signal. This arrangement is particularly useful when it is desired to control the pulse termination from another circuit and when the output pulse is to be of considerably longer duration than the input pulse. Alternatively, the output may be switched to point 332 by operation of switch 330, in which case operation of switch 318 by the termination control will always terminate the output pulse regardless of the duration of the input signal. The arrangement shown in Figures 3 and 4 would be practical, of course, only with pulse speeds of the order of less than 10 pulses per second. At megacycle rates, which is the primary field of interest for my invention, high-speed switching circuits must be employed, and I shall now describe such a circuit in connection with Figure 5.

The arrangement shown in Figure 5 depicts one practical utilization circuit employing the principles of this invention. The only vacuum tube used in this circuit is shown at 201, and may represent the vacuum tube depicted in Figure 1. The output of this vacuum tube leads into a pulse transformer 200, whose secondary 210 is connected at 220 to the utilization circuit in the next stage. A lead 204 from the output is fed into the or-gate 206, which is the same as the element 6 in Figure 1. By or-gate is meant a gate such as shown at 6 having a number of inputs any one of which is sufficient to energize the gate. This is in contrast to the and-gate shown at 11 in Figure 1, all of whose inputs must be simultaneously energized to produce an output. It will be noted that lead 204 in Figure 5 corresponds to lead 4 in Figure 1. Another input to or-gate 206 is provided by lead 207. This receives the input pulse from the preceding stage, which is in deteriorated form and is to be reshaped. The arrival of a pulse on lead 207 may serve to energize the entire stage in the fashion described in connection with Figure 1; that is, the input pulse on 207 passes through to lead 208, thence through coincidence gate i. e., and-gate 211, which corresponds to the coincidence gate shown in Figure 1. The detailed mode of operation of these gates will be described below. The pulse entering on lead 208 will not pass through or energize the coincidence gate unless and until there is also a clock pulse ($CP_3$) present on lead 209. Upon coincidence of pulses on leads 208 and 209, the reshaped pulse is transmitted on lead 202 to the grid of tube 201, the output of which is connected to the primary of pulse transformer 200. As long as the current in the primary of transformer 200 is increasing, the secondary 210 will have a voltage induced in it. This voltage must be of a duration sufficient to overlap the width of the widest clock pulse which may be used in the circuit. During the time that a voltage is being induced in secondary 210 of the pulse transformer 200, a voltage will appear on line 204, which will therefore pass through or gate 206 to line 208 regardless of the presence or absence of the initiating pulse on line 207, and if the clock pulse is still present at line 209, the input on line 202 to tube 1 continues. This condition continues to exist until termination of the clock pulse on line 209, provided, of course, that the tube or transformer has not become saturated because of the steadily increasing current therethrough. This, of course, depends primarily on the impedance characteristic of transformer 200. If this transformer is properly designed it will readily maintain a pulse through it of sufficient duration to overlap the clock pulse and thus serve the intended purpose. It will be noted that, although crystal diode gates are shown, vacuum tube gates of known type could equally well be used both for the and-gate and for the or-gate.

The mode of operation of the crystal diode gates will now be described. Assuming that the circuit is in the energized state, a positive pules arriving on line 207 will be passed through the crystal diode 30 and appear on line 208, raising the potential of the cathode of crystal diode 31. The anode of crystal 31 has previously been held near −8 volts by diode 32, the current flow through resistor 13K, diodes 31, 33, and 34 in parallel, and their respective resistors 8.2K, 7.5K, and 36K, this voltage being such that the grid of tube 201 is biased to produce a low value of current flow. However the coincidence of a positive input pulse on the cathode of diode 31 and a positive clock pulse on the cathode of diode 33 renders these diodes in effect nonconducting so far as the previously applied potential on their anodes is concerned. Therefore the current in resistor 13K must now flow through resistor 36K, whose resistance is higher than the previously available path and is so designed that the potential at the cathode of diode 34 (and therefore at the grid of tube 201) rises so that the tube becomes more conducting. The value of the rise is limited by "bumper" diode 37 whose cathode is supplied at the +2 volt level so that if the grid voltage tends to rise above this value, diode 37 becomes conducting and limits the rise to about +2 volts. Similarly on the negative swing "bumper" diode 38 holds the voltage fall at the tube grid to −5 volts, so that the maximum voltage swing at the grid is 7 volts, which is sufficient with the tube employed to produce the desired operation.

Raising the grid bias of tube 201, as described, causes the tube to become more conducting. The resulting current rise in the primary of pulse transformer 200 causes a positive voltage to appear in about $\frac{1}{10}$ microsecond on line 204. This voltage is maintained while current is building up in the primary of transformer 200, which would continue for over 1 microsecond if not interrupted, with the particular design of transformer employed. Of course, a transformer of higher inductance would have a longer pulse duration time, but also a slower rise time. The voltage on line 204 appears on diode 39 of or-gate 206 and thus regeneratively maintains the desired positive potential at the cathode of diode 31, so that as long as the clock pulse is present, the above-described condition is maintained. However, termination of the clock pulse again provides a conducting path through diode 33 and resistor 7.5K, and the potential of the grid falls promptly to its original value for tube 201. In practice, of course, the voltage rise described is not instantaneous, but is determined by the R. C. constant of the circuit, the capacity being that of the leads and grid, but this capacity can easily be maintained sufficiently low so that the rise and fall times of the pulses are of a satisfactorily brief order compared to the pulse duration. The above-described circuit will therefore perform the functions logically described in connection with Figure 1. It is noted that the reference characters applied to the resistors also denote their value in the usual manner, the letter K denoting 1000 ohms.

It will be apparent that instead of the diode type of gating shown, vacuum-tube gating could be employed. The advantage of the circuit shown is that it requires the use of only one vacuum tube, the other elements being inexpensive, long-lived crystal diodes, such as available germanium crystal diodes, requiring no filament supply and permitting fairly simple circuitry. The use of a pulse transformer also eliminates an additional vacuum tube which would otherwise be required for voltage inversion. On the other hand it limits the duration of the maximum period of regeneration, since the voltage on the secondary dies out when steady-state conditions are attained. However, this is unimportant where one is dealing with clock pulses and utilization pulses whose duration is briefer still.

If it is desired to maintain a pulse for a much longer period than is possible with the arrangement shown, instead of using the pulse transformer, the output of the vacuum tube may be used to cut off a following vacuum tube that is normally conducting, and the resulting plate voltage rise of the second tube may be fed into the or-gate so that line 9 (Figure 1) may be energized by a voltage of any desired duration, and the output of line 12 will then follow the duration of the input on line 9 indefinitely. Similarly, a multivibrator of the Eccles-Jordan type could be energized in place of tube 201 so that it would maintain an output until cessation of the clock pulse.

While I have shown the preferred form of my invention in Figure 5, the other figures of the drawing being primarily illustrative of the principle of the invention, it should be understood that various modifications thereof will be apparent to those skilled in the art, and that the invention is not limited except as indicated by the appended claims.

I claim:

1. In the art of electric pulse circuitry, wherein timed pulses of a predetermined shape, amplitude, and phase are utilized to control the energization of certain components in serial fashion, an arrangement for reshaping and retiming input pulses which comprises input gate means having at least two input leads and so arranged that energization of any input lead by a signal voltage will transmit a signal voltage to a common output lead; coincidence gate means having at least two input leads and an output lead so arranged and constructed that only while all input leads are energized can a signal appear on an output lead, one of said input leads being connected to the output of said input gate means and the other input lead being supplied with periodic clock pulses of the desired shape and phase, an amplifier having its input fed from the output of the coincidence gate means, and its output connected to the primary of a transformer, a lead from the secondary of said transformer to one of the input leads of said input gate means, an output lead from the secondary of said transformer for utilization in a following stage, and means for supplying an input pulse, which is to be reshaped, to the other input lead of said input gate means in such phase relation that the leading edge of the clock pulse will coincide with a substantial portion of the supplied input pulse.

2. Means for reshaping an electric pulse, which comprises an or-gate having at least two inputs and an output; an and-gate having at least two inputs and an output, one input of said and-gate connected to the output of said or-gate and another input of said and-gate connected to a source of clock pulses; a power source controlled by the output of said and-gate for actuation thereby; a feedback lead and an output lead from said power source, said feedback lead constituting one input to said or-gate; and means for supplying an input pulse, which is to be reshaped, to the other input of the or-gate.

3. In the art of electric pulse circuitry, wherein timed pulses of a predetermined shape, amplitude, and phase are utilized to control the energization of certain components in serial fashion, an arrangement for reshaping and retiming input pulses, which comprises input gate means having at least two input leads and so arranged that energization of any input lead by a signal voltage will transmit a signal voltage to a common output lead; coincidence gate means having at least two input leads and an output lead so aranged and constructed that only while all input leads are energized can a signal appear on an output lead, one of said input leads of said coincidence gate means being connected to the output of said input gate means and the other coincidence gate input lead being supplied with periodic clock pulses of the desired shape and phase; and amplifier having its input fed from the output of the coincidence gate means and its output connected to a phase inversion means; a lead from the output of said phase inversion means to one input of said input gate means; and means for supplying an input pulse, which is to be reshaped, to the other input lead of said input gate means in such phase relation that the leading edge of the clock pulse will coincide with a substantial portion of the supplied input pulse.

4. A pulse-forming network for generating an output pulse as a function of a first input pulse and a second standard control pulse having a fixed frequency of recurrence, a selectively energizable output-pulse generator, control means for supplying a control signal to the input of said pulse generator for selectively determining the period of energization of the generator, said control means comprising a signal-coincidence circuit requiring the concurrence of a plurality of input signals to produce said output-control signal, means for applying said second standard control pulse as a first signal input to said control means, a signal feedback loop connected to the generator output, means responsive to said feedback loop and to said first input pulse for producing an output signal for a period commensurate with the duration of either of said last-mentioned applied input signals, and means for applying said output signal as a second signal input to said control means.

References Cited in the file of this patent

UNITED STATES PATENTS

| | | |
|---|---|---|
| 2,070,900 | Harris | Feb. 16, 1937 |
| 2,258,732 | Blumlein et al. | Oct. 14, 1941 |
| 2,406,978 | Wendt et al. | Sept. 3, 1946 |
| 2,419,340 | Easton | Apr. 22, 1947 |
| 2,429,227 | Herbst | Oct. 21, 1947 |
| 2,468,058 | Grieg | Apr. 26, 1949 |
| 2,482,974 | Gordon | Sept. 27, 1949 |
| 2,646,501 | Eckert et al. | July 21, 1953 |
| 2,673,293 | Eckert et al. | Mar. 23, 1954 |